US009124630B1

(12) United States Patent
Saylor et al.

(10) Patent No.: US 9,124,630 B1
(45) Date of Patent: Sep. 1, 2015

(54) AGGREGATING SOCIAL LOCATION INFORMATION

(71) Applicant: MicroStrategy Incorporated, Vienna, VA (US)

(72) Inventors: Michael J Saylor, Vienna, VA (US); Peter Jerome DiDomenico, III, Amissville, VA (US)

(73) Assignee: MicroStrategy Incorporated, Vienna, VA (US)

( * ) Notice: Subject to any disclaimer, the term of this patent is extended or adjusted under 35 U.S.C. 154(b) by 315 days.

(21) Appl. No.: 13/864,045

(22) Filed: Apr. 16, 2013

Related U.S. Application Data

(60) Provisional application No. 61/637,802, filed on Apr. 24, 2012.

(51) Int. Cl.
*G06F 15/16* (2006.01)
*H04L 29/08* (2006.01)
*G06Q 50/00* (2012.01)

(52) U.S. Cl.
CPC .............. *H04L 67/18* (2013.01); *G06Q 50/01* (2013.01)

(58) Field of Classification Search
CPC ................................................... G06Q 50/01
See application file for complete search history.

(56) References Cited

U.S. PATENT DOCUMENTS

| 8,352,183 | B2 * | 1/2013 | Thota et al. ................... 701/454 |
| 2008/0104225 | A1 * | 5/2008 | Zhang et al. .................. 709/224 |
| 2009/0100037 | A1 * | 4/2009 | Scheibe ........................... 707/5 |
| 2009/0198562 | A1 * | 8/2009 | Wiesinger et al. .............. 705/10 |
| 2009/0233629 | A1 * | 9/2009 | Jayanthi ........................ 455/457 |
| 2013/0006749 | A1 * | 1/2013 | Fink et al. .................. 705/14.39 |

* cited by examiner

*Primary Examiner* — Shirley Zhang
(74) *Attorney, Agent, or Firm* — Fish & Richardson P.C.

(57) ABSTRACT

In one implementation, user identities who are members of a particular user identity's social network are identified. In addition, data is accessed that reveals locations that at least some of the identified other user identities have registered with the platform as locations that they have visited. A view of an aggregation of at least some of the locations where other user identities who are members of the particular user identity's social network have registered that they have visited is made available for display. In another implementation, data is accessed that reveals residence information for user identities who are members of a particular user identity's social network. Thereafter, a view of an aggregation of at least some of the residence information for the other user identities who are members of the particular user identity's social network is made available for display.

20 Claims, 8 Drawing Sheets

FIG. 4A

| Friend Hometown | # Friends | Avg. Age | Female % | Male % | Single % | Non-Single % |
|---|---|---|---|---|---|---|
| Atlanta | 46 | 40 | 52% | 48% | 13% | 87% |
| San Jose | 34 | 38 | 59% | 41% | 12% | 88% |
| Raleigh | 28 | 46 | 71% | 29% | 29% | 71% |
| Charleston | 18 | 41 | 44% | 56% | 6% | 94% |
| Richmond | 16 | 42 | 50% | 50% | 19% | 81% |
| Boston | 10 | 36 | 60% | 40% | 10% | 90% |
| Dallas | 8 | 40 | 25% | 75% | 25% | 75% |
| Philadelphia | 6 | 52 | 33% | 67% | 33% | 67% |
| Greenville | 5 | 29 | 60% | 40% | 20% | 80% |

Places — Hometown — By Friendlist (All Friends) — Filter 402, 400, 404, 406, 408, 410, 412, 414, 418, 416, 420

FIG. 4B

Filter panel (421):
- Location
  - Country: All
  - State: All
  - City: All
- Demographics
  - Age (18-64)
  - Gender: ● All  ○ Male  ○ Female
- Relationship Status
  - ☒ All
  - ☒ Engaged
  - ☒ In a Relationship
  - ☒ Married
  - ☒ Single

400
Places
Hometown     By Friendlist (All Friends ▼) (Filter) — 418, 422

| Friend Hometown | # Friends | Avg. Age | Female % | | | Non-Single % |
|---|---|---|---|---|---|---|
| Atlanta | 46 | 40 | 52% | Friend List | | 87% |
| San Jose | 34 | 38 | 59% | ▶ All | | 88% |
| Raleigh | 28 | 46 | 71% | Family | | 71% |
| Charleston | 18 | 41 | 44% | Work | | 94% |
| Richmond | 16 | 42 | 50% | Social | | 81% |
| Boston | 10 | 36 | 60% | 40% | 10% | 90% |
| Dallas | 8 | 40 | 25% | 75% | 25% | 75% |
| Philadelphia | 6 | 52 | 33% | 67% | 33% | 67% |
| Greenville | 5 | 29 | 60% | 40% | 20% | 80% |

FIG. 4C 420

400
Places
Hometown     By Friendlist (All Friends ▼) (Filter)

| Friend Hometown | # Friends | Avg. Age | Female % | Male % | Single % | Non-Single % |
|---|---|---|---|---|---|---|
| Atlanta | 46 | 40 | 52% | 48% | 13% | 87% |
| San Jose | 34 | 38 | 59% | 41% | 12% | 88% |
| Raleigh | 28 | 46 | 71% | 29% | 29% | 71% |
| Charleston | 18 | 41 | 44% | 56% | 6% | 94% |
| Richmond | 16 | 42 | 50% | 50% | 19% | 81% |
| Boston | 10 | 36 | 60% | 40% | 10% | 90% |
| Dallas | 8 | 40 | 25% | Hometown | 25% | 75% |
| Philadelphia | 6 | 52 | 33% | Current City | 33% | 67% |
| Greenville | 5 | 29 | 60% | Check-Ins | 20% | 80% |

FIG. 4D 420, 424

| Friend Current City | # Friends | Avg. Age | Female % | Male % | Single % | Non-Single % |
|---|---|---|---|---|---|---|
| Washington | 30 | 44 | 50% | 50% | 13% | 87% |
| Atlanta | 26 | 39 | 58% | 42% | 23% | 77% |
| McLean | 20 | 42 | 60% | 40% | 10% | 90% |
| New York | 20 | 32 | 55% | 45% | 5% | 95% |
| Boston | 18 | 38 | 33% | 67% | 6% | 94% |
| San Francisco | 16 | 48 | 56% | 44% | 6% | 94% |
| Warrenton | 8 | 46 | 50% | 50% | 12% | 88% |
| Raleigh | 7 | 41 | 57% | 43% | 0% | 100% |
| Richmond | 7 | 39 | 43% | 57% | 43% | 57% |

FIG. 4E

| Check-In Place | Total Check-Ins | Distinct Friends | Repeat Visitors | Avg. Age | Female % | Male % | Single % | Non-Single % |
|---|---|---|---|---|---|---|---|---|
| Fox & Hound Pub | 14 | 8 | 3 | 34 | 63% | 37% | 12% | 88% |
| Spider Kelly's | 14 | 6 | 2 | 36 | 50% | 50% | 17% | 83% |
| Fireworks Pizza | 12 | 6 | 6 | 44 | 67% | 33% | 0% | 100% |
| Atlanta, Georgia | 8 | 1 | 1 | 40 | 0% | 100% | 0% | 100% |
| Washington National Airport | 7 | 4 | 2 | 42 | 50% | 50% | 50% | 50% |
| California Tortilla | 7 | 3 | 2 | 41 | 100% | 0% | 33% | 67% |
| Fado Irish Pub | 6 | 2 | 2 | 35 | 0% | 100% | 100% | 0% |
| World Café | 5 | 1 | 5 | 40 | 0% | 100% | 100% | 0% |
| San Francisco Int'l Airport | 4 | 4 | 0 | 39 | 75% | 25% | 25% | 75% |

FIG. 4F

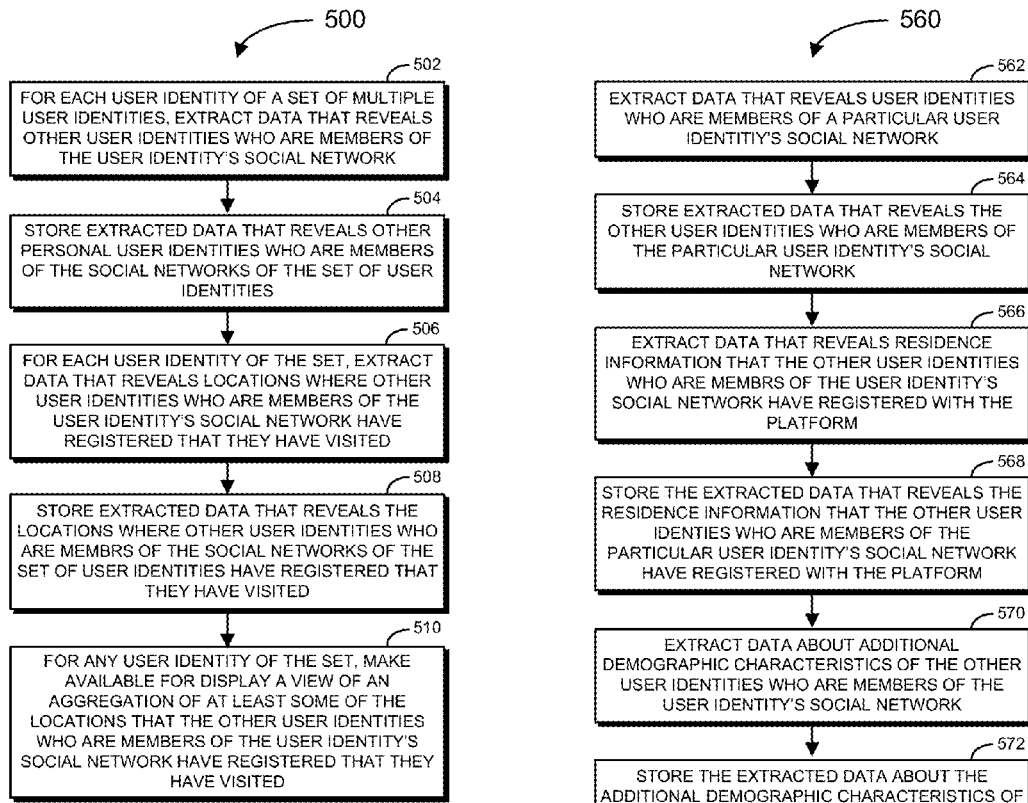
FIG. 5A
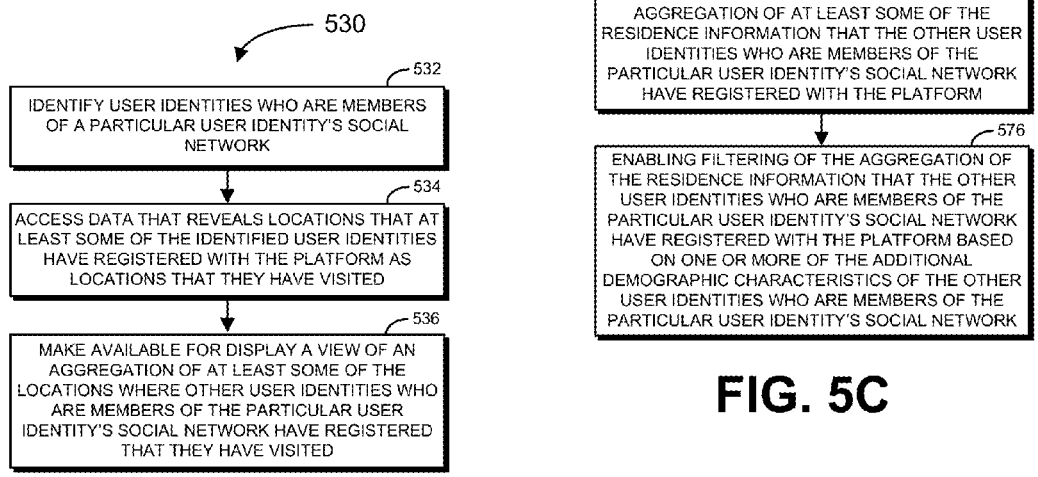
FIG. 5B
FIG. 5C

AGGREGATING SOCIAL LOCATION INFORMATION

CROSS-REFERENCE TO RELATED APPLICATION

This application claims priority from U.S. Provisional Patent Application Ser. No. 61/637,802, filed Apr. 24, 2012, and titled "AGGREGATING SOCIAL LOCATION INFORMATION," which is incorporated herein by reference in its entirety.

BACKGROUND

Electronic communications platforms often allow users of the platforms to share information with one another. The volume of information available to individual users within such electronic communications platforms may be relatively large. Consequently, an individual user of an electronic communications platform may have difficulty managing or even locating information available to the user within the electronic communications platform. As a result, the user may miss, gloss over, or otherwise fail to appreciate information of some level of significance that is available to the user within the electronic communication platform.

BRIEF DESCRIPTION OF THE DRAWINGS

FIGS. 4A-4F are diagrams of examples of a GUI for a social intelligence application that enables review of aggregated location information relevant to a user identity within an electronic social networking platform.

FIGS. 5A-5C are flow charts that illustrate examples of different processes.

DETAILED DESCRIPTION

Figure 1A:
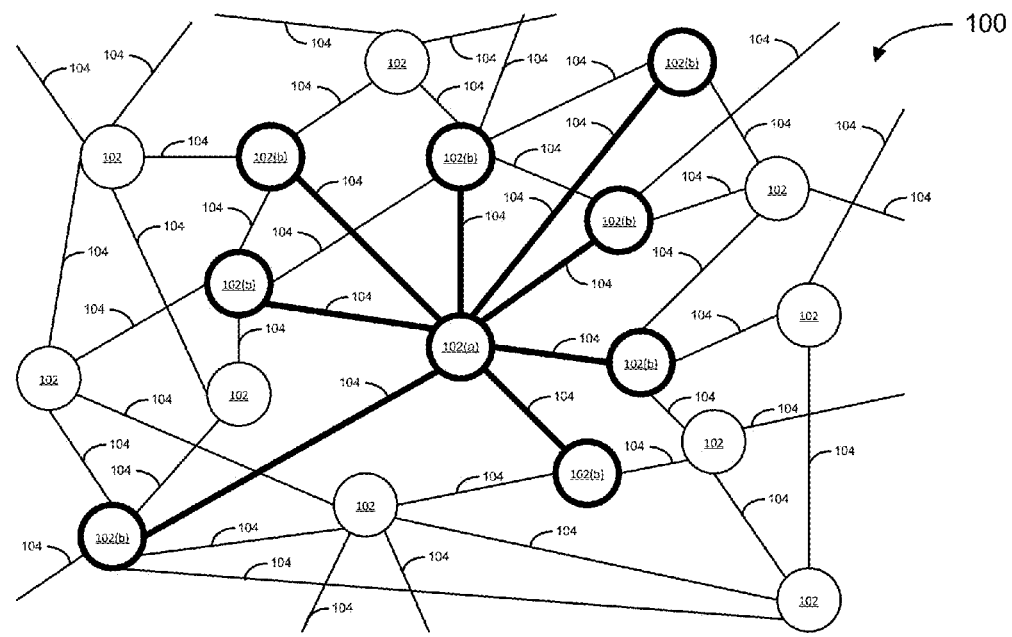
FIGS. 1A and 1B are schematic diagrams of examples of electronic social networking platforms.

In some implementations, location information registered with an electronic social networking platform by members of a user identity's social network (e.g., hometowns, current residences, and/or "check-ins") is extracted from the electronic social networking platform. The extracted location information then may be aggregated and made available to the user identity of the electronic social networking platform (e.g., via an electronic device), and the user identity may be provided with the ability to manipulate the extracted location information. For example, the user identity may be provided with the ability to filter the location information based on one or more demographic or other characteristics of the other user identities who registered the location information with the electronic social networking platform.

There are many different examples of electronic social networking platforms. Facebook, Twitter, LinkedIn, Google+, MySpace, and Orkut are just a few examples. But, there are many others, and it is reasonable to expect many more to be launched in the future. The techniques described herein for handling data available within an electronic social networking platform are widely applicable and may be applied to data available within any relevant electronic social networking platform.

Electronic social networking platforms frequently enable individual user identities (e.g., users who have registered with a platform and/or who have been assigned a unique or otherwise identifying identifier by the platform) to establish connections with other user identities. These connections between user identities may reflect relationships between the underlying human users who correspond to the user identities. For example, a connection between two user identities within an electronic social networking platform may reflect a social friendship (e.g., developed through physical interaction in the real-world and/or through on-line interaction in the cyber-world) or a professional relationship between the underlying human users who correspond to the user identities.

In some electronic social networking platforms, a user identity may be able to unilaterally form a connection with another user identity. For example, an electronic social networking platform may enable a first user identity to form a connection to a second user identity simply by specifying a desire to form a connection to the second user identity and without requiring approval of the connection by the second user identity. Alternatively, in other electronic social networking platforms, the formation of connections between two user identities may be a bilateral process. For example, in such electronic social networking platforms, when a first user identity specifies a desire to form a connection to a second user identity, the electronic social networking platform may establish the connection only after the second user identity approves the formation of the connection between the first user identity and the second user identity.

The connections formed between individual user identities within an electronic social networking platform may be represented in the form of a graph, where user identities are represented by nodes and connections between user identities are represented by edges connecting the nodes. Such a graph of interconnected user identities may change dynamically in time as new user identities join and old user identities quit the electronic social networking platform and/or as new connections are formed and old connections are dissolved. Proximity between two user identities of an electronic social networking platform may be measured in terms of degrees of separation between the two user identities. For example, proximity between two user identities of an electronic social networking platform may be calculated as the fewest number of edges required to form a path between the two user identities within the graph representing the connections between user identities of the electronic social networking platform.

A user identity of an electronic social networking platform may form a social network within the electronic social networking platform by forming connections to other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to include a group of other user identities that are within a threshold number of degrees of separation of the particular user identity within the graph.

Electronic social networking platforms commonly facilitate sharing of information and the exchange of electronic communications between user identities and other user identities who are part of their social networks. In some implementations, an electronic social networking platform may allow a particular user identity to access more detailed profile information about the other user identities who are part of the particular user identity's social network than the electronic social networking platform allows the particular user identity to access about user identities who are not part of the particular user identity's social network. For example, an electronic social networking platform may allow a particular user identity to access information about the hometowns and/or the current cities of residence of other user identities who are part of the particular user identity's social network, but the electronic social networking platform may not allow the particular user identity to access this same information for user identities who are not part of the particular user identity's social network.

Additionally or alternatively, an electronic social networking platform may provide communications conduits between a particular user identity and the other user identities who are part of the particular user identity's social network that the electronic social networking platform does not otherwise provide between the particular user identity and other user identities who are not part of the particular user identity's social network.

Furthermore, some electronic social networking platforms may enable user identities to record information within the electronic social networking platforms about locations they have visited. In some cases, a user identity may be said to record a "check-in" with an electronic social networking platform when the user identity records information within the electronic social networking platform about a location the user identity has visited. Some electronic social networking platforms also may enable user identities to record "check-ins" on behalf of other user identities. For instance, some electronic social networking platforms may enable members of a particular user identity's social network to record a "check-in" on behalf of the particular user identity (e.g., when the user identities visit a location together). In such scenarios, the electronic social networking platform may record the location as a location the particular user identity visited even though the "check-in" at the location was not initiated by the particular user identity.

In addition, these electronic social networking platforms may enable a particular user identity to access such information about locations that members of the particular user identity's social network have registered with the social networking platforms. However, these electronic social networking platforms may not allow a particular user identity to access similar information about locations that other user identities who are not members of the particular user identity's social network registered with the social networking platforms. In some electronic social networking platforms, when a user identity registers a location that the user identity has visited, messages may be broadcast to members of the user identity's social network reporting that the user identity has registered the location as a location that the user identity has visited.

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection that has been formed between the two user identities that are represented by the connected nodes 102. For example, the edges 104 that connect node 102(a) to nodes 102(b) represent connections that have been formed within the electronic social networking platform between the user identity represented by node 102(a) and the other user identities represented by nodes 102(b).

As discussed above, in some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(a) would be defined as the group of other user identities represented by nodes 102(b).

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user identity of an electronic social networking platform may wish to define subsets of user identities within the particular user identity's social network that reflect other user identities with whom the particular user identity has a familial relationship, a professional relationship, or a social relationship. For ease of reference, such defined subsets of a particular user's social network may be referred to herein as "Friendlists."

As further discussed above, an electronic social networking application may facilitate the sharing of information and the exchange of electronic communications between a particular user identity and other user identities who are part of the particular user identity's social network. For example, referring to the electronic social networking platform represented in FIG. 1A, the electronic social networking application may provide mechanisms that facilitate the exchange of electronic communications between the user identity represented by node 102(a) and the user identities represented by nodes 102(b) who are part of the social network of the user identity represented by node 102(a). In some implementations, the electronic social networking application may provide a mechanism that enables the user identity represented by node 102(a) to send private electronic messages to any one or more of the user identities represented by nodes 102(a). Furthermore, the electronic social networking application also may provide a mechanism that enables the user identity represented by node 102(a) to broadcast an electronic message that is shared publicly with all (or some defined subset of all, such as, for example, one or more "Friendlists") of the user identities represented by nodes 102(b). Additionally or alternatively, the electronic social networking application may provide a mechanism that enables the user identity represented by node 102(a) to send a directed electronic message to a user identity that is represented by a particular one of nodes 102(b). In such cases, the recipient user identity of the directed message may determine whether this directed message is shared publicly with other user identities of the electronic social networking platform.

In addition to enabling user identities to establish connections to other user identities, some electronic social networking platforms enable user identities to establish connections with other types of objects. For example, some social networking platforms may enable user identities to record information about their hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms. Additionally or alternatively, some social networking platforms may enable user identities to record information about events to which they have been invited, are planning to attend, and/or have attended by establishing connections to event objects within the electronic social networking platforms. Similarly, some social networking platforms may enable user identities to record endorsements of non-personal enterprises, such as, for example, local businesses or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities by establishing connections to non-personal enterprise objects within the electronic social networking platforms. In some such electronic social networking platforms, non-personal enterprise objects may be manifested as so-called pages that are maintained by one or more representatives of the non-personal enterprise objects and that, among other features, provide information about the non-personal enterprise objects and that provide conduits for enabling interaction between the non-personal enterprise objects and the user identities that have formed connections to the non-personal enterprise objects. Furthermore, some social networking platforms may enable user identities to establish connections with independent applications that leverage the social networking platforms, for example, by granting the independent applications authorization to access or extract data from the electronic social networking platform on their behalf.

Figure 1B:
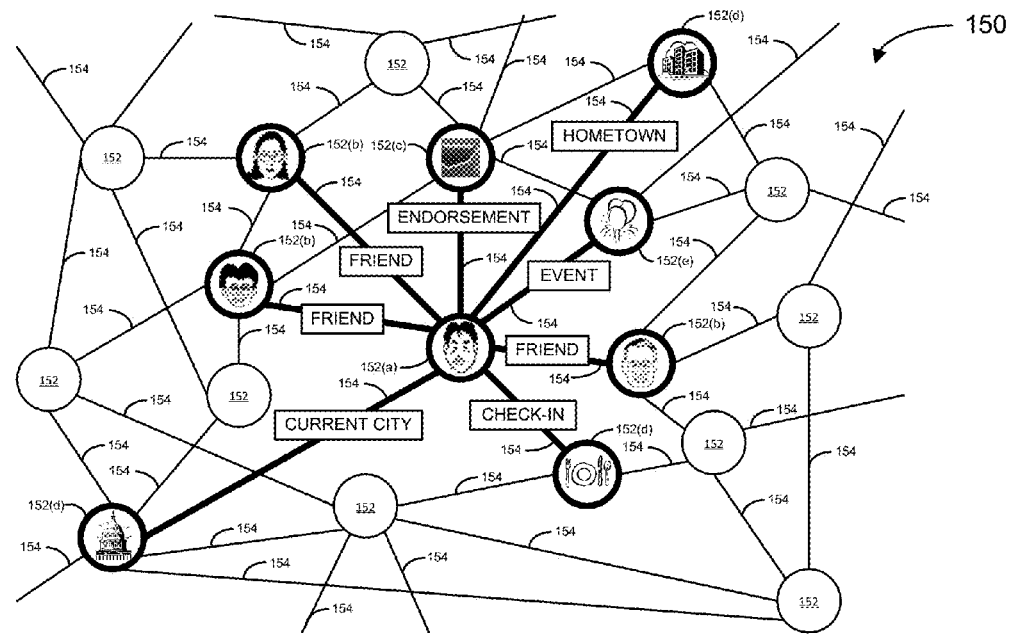

FIG. 1B is a schematic diagram of an example of an electronic social networking platform that enables user identities to form connections with multiple different types of objects including, for example, other user identity objects, location objects, event objects, and non-personal enterprise objects. As illustrated in FIG. 1B, the electronic social networking platform is represented as a graph 150 of nodes 152 connected by edges. Each node 152 in the graph 150 represents a particular type of object in the electronic social networking platform. For example, nodes 152(*a*) and 152(*b*) represent user identity objects, while node 152(*c*) represents a non-personal enterprise object, nodes 152(*d*) represent location objects, and node 152(*e*) represents an event object.

An edge 154 that connects two nodes 152 represents a connection that has been formed between the two objects that are represented by the connected nodes 152. For example, the edges 154 that connect node 152(*a*) to nodes 152(*b*) represent connections that have been formed between the user identity represented by node 102(*a*) and the user identities represented by nodes 152(*b*). (For ease of reference, such a connection between two user identity objects in an electronic social networking platform may be referred to herein as a "friend" connection.)

Similarly, the edge 154 that connects node 152(*a*) to node 152(*c*) represents a connection between the user identity represented by node 152(*a*) and the non-personal enterprise object represented by node 152(*c*). (As discussed above, a user of an electronic social networking platform may form a connection to such a non-personal enterprise object in order to record an endorsement of the non-personal enterprise represented by the object. Therefore, for ease of reference, connections between a user identity object and a non-personal enterprise object in an electronic social networking platform may be referred to herein as an "endorsement" connection.)

Furthermore, the edges 154 that connect node 152(*a*) to nodes 152(*d*) represent connections that have been formed between the user identity represented by node 152(*a*) and the location objects represented by nodes 152(*d*). Depending on the electronic social networking platform, a user identity may be able to establish various different types of connections to location objects.

For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" connection to a location object that represents the user identity's current residence.

Moreover, in order to store a record of a place the user identity visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a "check-in" connection to a location object that represents a place that the user identity visited. In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS) and/or map data available to the mobile computing device.

Finally, the edge 154 that connects node 152(*a*) to node 152(*e*) represents a connection that has been formed between the user identity represented by node 152(*a*) and the event represented by event object 152(*e*). (For ease of reference, such a connection between a user identity object and an event object may be referred to herein as "event" connections.")

In some electronic social networking platforms that enable user identities to form connections with object types like location objects, event objects, and non-personal enterprise objects, such location objects, event objects, and/or non-personal enterprise objects each may be associated with one or more representatives. Furthermore, the electronic social networking platforms may enable these representatives to interact with the user identities to whom the objects are connected using the manifestation of the object within the electronic social networking platform. For example, a non-personal enterprise object within an electronic social networking platform may be manifested as a "page" that provides information about the non-personal enterprise that the object represents, and the electronic social networking platform may enable one or more designated representatives associated with the "page" to share information and exchange electronic communications with the user identities connected to the non-personal enterprise object in a manner in which such shared information or exchanged communications appear to involve the "page" as opposed to an individual user identity. In one particular example, the electronic social networking platform may provide a mechanism that enables one or more representatives associated with the non-personal enterprise to broadcast an electronic message that is shared publicly with all (or some defined subset of all) of the user identities to which the non-personal enterprise object is connected.

Electronic social networking platforms often enable user identities to maintain user profiles or other collections of data that include information about the user identities to whom they correspond. Such a profile for an individual user identity of an electronic social networking platform may include, among other information, information about the user identity's hometown, current residence, age, gender, relationship status, educational background, and/or professional background. In some electronic social networking platforms, at least some of the profile information recorded for an individual user identity may be represented by connections between the user identity and other types of objects within the electronic social networking platforms. For example, information about a user identity's hometown and/or current residence may be represented as a connection between the user identity and one or more different location objects, for example, as described above in connection with FIG. 1B.

The different examples of electronic social networking platforms described above may provide various different types of user interfaces for interacting with the electronic social networking platforms. In one particular example, an electronic social networking platform may provide multiple different GUIs to a user identity to enable the user identity to interact with the underlying electronic social networking platform.

In this example, the electronic social networking platform may provide a first GUI to the user identity that (among other features) presents to the user identity a feed that includes: (i) electronic messages that have been shared with the user identity by other user identities who are members of the user identity's social network and/or by other types of objects (e.g., location, event, and non-personal enterprise objects) to which the user identity is connected; and/or (ii) information about activities engaged in within the context of the electronic social networking platform by other user identities who are members of the user identity's social network. (For ease of reference, this feed presented to a user identity in the first GUI provided by the electronic social networking platform may be referred to as the user identity's "news feed.")

In addition to the first GUI described above in connection with this example, the electronic social networking platform also may provide a second GUI to the user identity that (among other features) presents to the user identity a feed that includes: (i) electronic messages that have been shared by the personal user identity with members of the personal user identity's social network (either in a broadcast or a directed fashion); (ii) electronic messages that were shared with the user identity by members of the user identity's social network and that were directed specifically to the user identity (that the user identity nevertheless may allow other members of the user identity's social network to view); and (iii) information about activities engaged in within the context of the electronic social networking platform by the user identity. (For ease of reference, this feed presented to a user identity in the second GUI provided by the electronic social networking platform may be referred to as the user identity's "personal feed.")

Figure 2A:
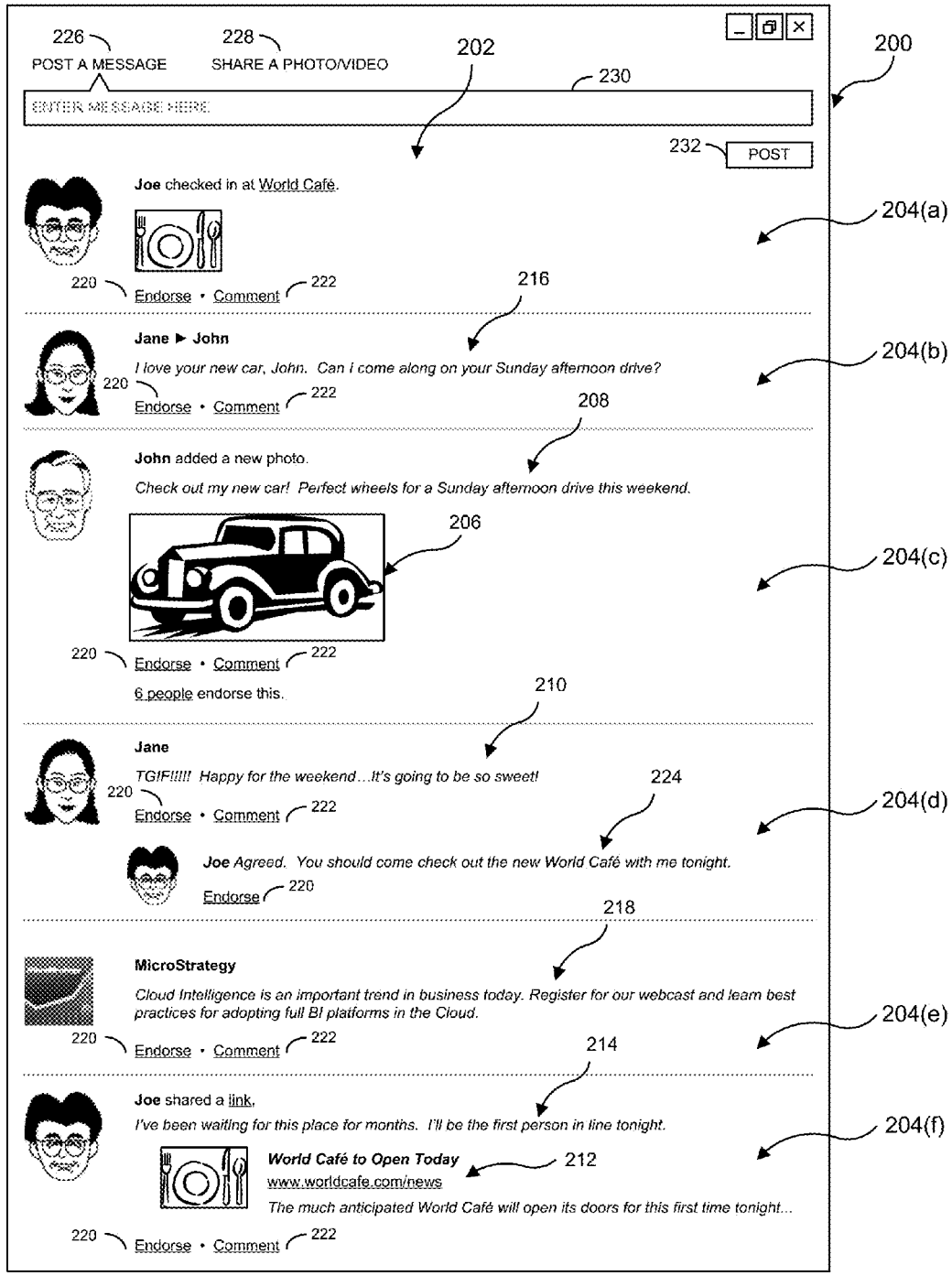
FIGS. 2A and 2B are diagrams of examples of graphical user interfaces (GUIs) for an example of an electronic social networking platform.
Figure 2B:
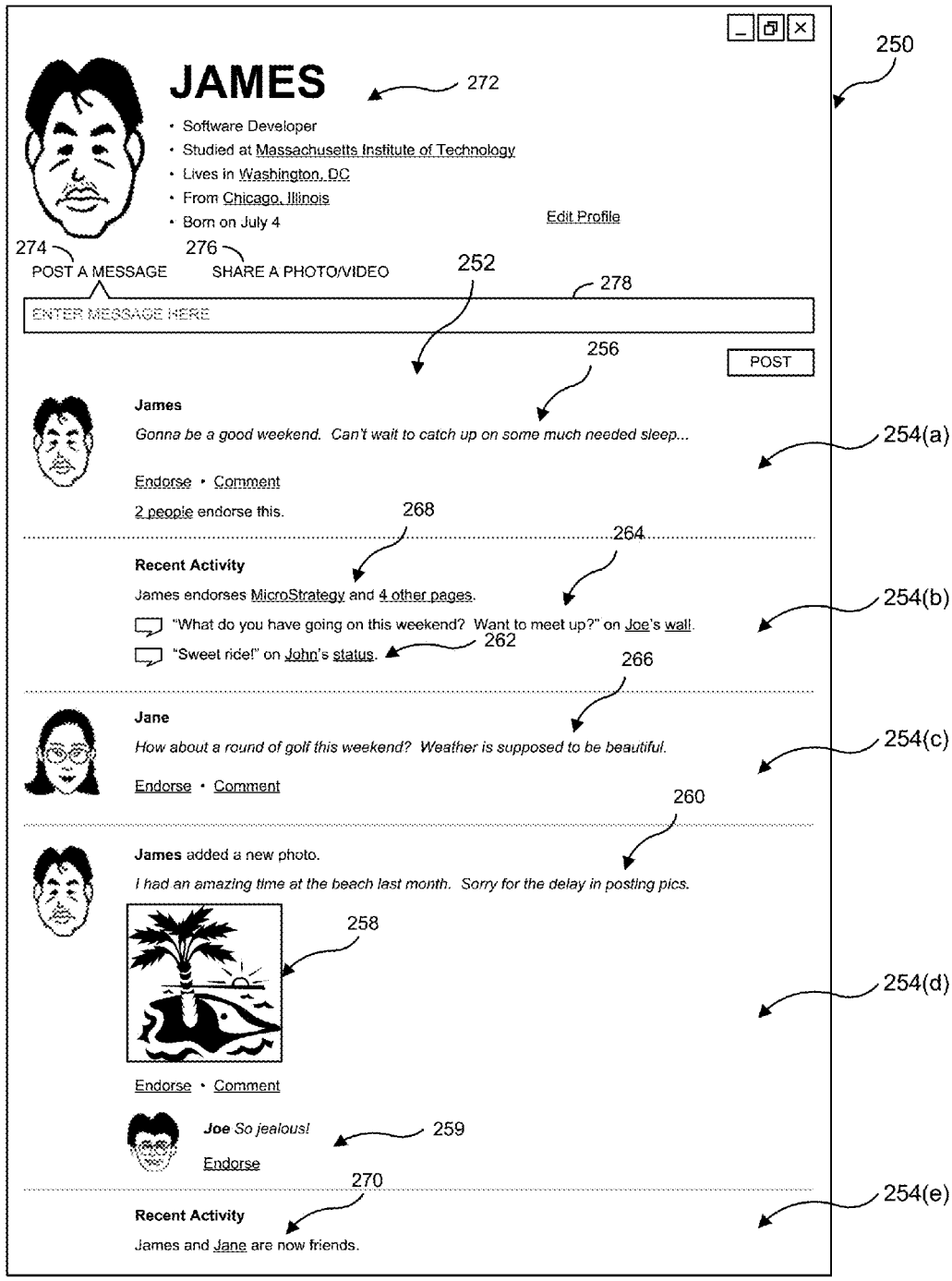

FIGS. 2A and 2B are diagrams of examples of two different GUIs 200 and 250, respectively, for an example of an electronic social networking platform. The GUI 200 presented in FIG. 2A illustrates an example of a GUI that presents a particular user identity's "news feed" 202 as described above, while the GUI 250 presented in FIG. 2B illustrates an example of a GUI that presents the particular user identity's "personal feed" 252 as described above.

Referring first to FIG. 2A, GUI 200 includes a "news feed" 202 that includes different feed items 204. The items 204 included within "news feed" 202 include content and/or electronic messages that have been shared with the particular user identity by other user identities who are members of the particular user identity's social network. For example, item 204(c) includes a picture 206 and a corresponding message 208 shared with the particular user identity by a member of the particular user identity's social network identified as John. Similarly, item 204(d) includes a message 210 shared with the particular user identity by a member of the particular user identity's social network identified as Jane, and item 204(f) includes a hyperlink 212 to a web page and a corresponding message 214 shared with the particular user identity by a member of the particular user identity's social network identified as Joe. Although not illustrated in FIG. 2A, in addition to enabling user identities to share pictures and hyperlinks with members of their social networks (e.g., as illustrated by items 204(c) and 204(f), respectively) the electronic social networking platform also may enable user identities to share other types of content with members of their social networks including, for example, videos.

Items 204(c), 204(d), and 204(f) may represent content and/or messages that the particular user identities who shared these items (i.e., John, Jane, and Joe, respectively) shared generally with multiple members of their own social networks. For ease of reference, messages and/or content that user identities share as general broadcast messages to multiple members of their social networks, such as, for example, picture 206 and corresponding message 208 of item 204(c), message 210 of item 204(d), and hyperlink 212 and corresponding message 214 of item 204(f), may be referred to herein as "status posts."

In addition to enabling user identities to send general broadcast messages to multiple members of their social networks, the electronic social networking platform also may enable user identities to send directed messages to individual user identities within their social networks. Such directed messages may be presented to the user identities to whom they are targeted within the targeted user identities' "personal feeds," and the electronic social networking platform may provide user identities with controls for configuring whether such directed messages also are shared with members of the targeted user identities' own social networks. In the event that a targeted user identity selects configuration settings that provide for directed messages to the targeted user to be shared with other members of the targeted user identity's social network, such directed messages may be presented to the other members of the targeted user identity's social network in their "news feeds."

Item 204(b) in the "news feed" 202 of the GUI 200 for a particular user identity of the electronic social networking platform is an example of a message 216 that was directed to a targeted user identity who is a member of the particular user identity's social network and who selected configuration settings that provided for the directed message to be shared with other members of the targeted user identity's own social network. More particularly, message 216 was directed to a member of the particular user identity's social network identified as John by another user identity identified as Jane. Because the user identity identified as John is a member of the particular user identity's social network and because the user identity identified as John selected configuration settings that provide for directed messages that target the user identity identified as John to be shared with other members of his social network, the directed message 216 from the user identity identified as Jane to the user identity identified as John is presented in the particular user identity's "news feed" 202. The user identity identified as Jane may or may not be a member of the particular user identity's own social network.

"News feed" 202 also includes information about activities engaged in within the context of the electronic social networking platform by other user identities who are members of the particular user identity's social network. For example, item 204(a) indicates that a user identity identified as Joe "checked-in" at a location identified as World Café. The location World Café may be represented as a location object within the electronic social networking platform and may correspond to, for example, a local restaurant.

The items 204 included within "news feed" 202 also include content and/or electronic messages that have been shared with the particular user identity by other types of objects (e.g., location, event, and non-personal enterprise objects) to which the user identity is connected. For example, item 204(e) includes a message 218 shared with the particular user identity by a non-personal enterprise object identified as MicroStrategy.

If the particular user identity is connected to a large number of non-personal enterprise objects that frequently share messages, the particular user identity's "news feed" 202 may be cluttered with messages shared by such non-personal enterprise objects. Consequently, the particular user identity may miss, gloss over, or otherwise fail to appreciate messages posted by other user identities who are members of the particular user identity's social network. Additionally or alternatively, if a large number of items continuously cycle through the particular user identity's "news feed" 202, the particular user identity may miss, gloss over, or otherwise fail to appreciate messages of some level of significance to the particular user identity posted by other user identities who are members of the particular user identity's social network.

The items 204 presented in "news feed" 202 provide mechanisms that enable the particular user identity to react to the objects included within the items 204 presented in "news feed" 202. For example, as illustrated in FIG. 2A, each of the items 204 presented in "news feed" 202 includes a selectable "Endorse" control 220 and a selectable "Comment" control 222. A selectable "Endorse" control 220 in an item 204 enables the particular user identity to register an endorsement of the object(s) (e.g., content, message, and/or activity) included in the item 204. The electronic social networking platform records such endorsements and may present the number of endorsements registered in connection with the object(s) presented in an item 204 in connection with the presentation of the item itself. For example, item 204(c) includes an indication that six different user identities have registered endorsements of the picture and message included in item 204(c).

A selectable "Comment" control 222 in an item 204 enables the particular user identity to enter a responsive comment to the object(s) included in the item 204. The electronic social networking platform records such responsive comments and associates them with the object(s) included in the item so that the electronic social networking platform may present any such responsive comments in connection with the presentation of the item 204 itself. For example, item 204(d) includes a message 224 by a user identity identified as Joe that was entered in response to the message 210 originally shared by the user identity identified as Jane.

In addition to "news feed" 202, GUI 200 also includes a selectable "Post Message" control 226, a selectable "Share Photo/Video" control 228, and an associated text entry field 230 and selectable "Post" control 232. Selectable "Post Message" control 226 enables the particular user identity to compose and post a status message by entering text in associated text entry field 230 and invoking selectable "Post" control 232. Similarly, selectable "Share Photo/Video" control 228 enables the particular user identity to share a picture or a video and to compose and post a corresponding status message by entering text in associated text entry field 230 and invoking selectable "Post" control 232.

Referring now to FIG. 2B, GUI 250 includes a "personal feed" 252 that includes different feed items 254. The items 254 included within "personal feed" 252 include content and/or electronic messages that the particular user identity shared with other members of the particular user identity's social network. Such content and/or electronic messages may include status posts that the particular user identity broadcasted generally to multiple members of the particular user identity's social network, responsive comments that the particular user identity entered in response to content and/or messages shared by other user identities who are members of the particular user identity's social network, and directed messages that the particular user identity shared with specifically targeted individual user identity's who are members of the particular user identity's social network.

For example, item 254(a) includes a status post 256 that the particular user identity broadcasted generally to multiple members of the particular user identity's social network. Similarly, item 254(d) includes a picture 258 and a corresponding message 260 that the particular user identity broadcasted generally to multiple members of the particular user identity's social network. To the extent that members of the particular user identity's social network enter responsive comments to and/or endorse status posts that the particular user identity broadcasts generally to multiple members of the particular user identity's social network, any such responsive comments or endorsements also may be presented within "personal feed" 254. For example, item 254(a) includes an indication that two user identities have endorsed message 256. Similarly, item 254(d) includes a message 259 that was entered by a member of the particular user identity's social network identified by the user identity Joe in response to the picture 258 and corresponding message 260 originally posted by the particular user identity.

Meanwhile, item 254(b) includes a responsive comment 262 that the particular user identity entered in response to content and/or a message shared by a member of the particular user identity's social network identified by the user identity John. Item 254(b) also includes a directed message 264 that the particular user identity shared with a specifically targeted member of the particular user identity's social network identified by the user identity Joe.

The items 254 included in "personal feed" 252 also include content and/or messages that were shared with the particular user identity by members of the particular user identity's social network and that were directed specifically to the particular user identity. For example, item 254(c) includes a message 266 that was shared with the particular user identity by a member of the particular user identity's social network identified by user identity Jane and that was directed specifically to the particular user identity.

In addition, the items 254 in "personal fee" 252 also include information about activities engaged in by the particular user identity within the context of the electronic social networking platform. For example, item 254(b) includes an indication 268 that the particular user identity has endorsed a non-personal enterprise object identified as MicroStrategy as well as four additional non-personal enterprise objects, all of which may be manifested within the electronic social networking platform in the form of individual "pages." Meanwhile, item 254(e) includes an indication 270 that the particular user identity has established a connection within the electronic social networking platform to the user identity identified as Jane.

In addition to "personal feed" 252, GUI 250 also includes a profile section 272 with profile information for the particular user identity. As illustrated in FIG. 2B, profile section 272 indicates that the particular user identity is identified by user identity James and includes profile information that specifies the particular user identity's professional background (software developer), alma mater (Massachusetts Institute of Technology), current residence (Washington, D.C.), hometown (Chicago), and birthday (July 4).

As with GUI 200, GUI 250 also includes a selectable "Post Message" control 274, a selectable "Share Photo/Video" control 276, and an associated text entry field 278 and selectable "Post" control 280. Selectable "Post Message" control 274 enables the particular user identity to compose and post a status message by entering text in associated text entry field 278 and invoking selectable "Post" control 280. Similarly, selectable "Share Photo/Video" control 276 enables the particular user identity to share a picture or a video and to compose and post a corresponding status message by entering text in associated text entry field 2278 and invoking selectable "Post" control 280.

As discussed above, the volume of content made available to a particular user identity of an electronic social networking platform may be relatively large, potentially leading the particular user identity to miss, gloss over, or otherwise fail to appreciate information of some level of significance to the particular user identity that is available to the particular user identity within the electronic social networking platform. As described herein, a social intelligence service that is external to an electronic social networking platform may extract content from the electronic social networking platform that is available to different user identities of the electronic social networking platform. Thereafter, the social intelligence service may process the extracted content and represent the extracted content and/or generate reports about the extracted content so as to enable the individual user identities to glean better intelligence from the large volume of content shared with them within the electronic social networking platform. For example, a social intelligence service may extract location information that is relevant to a particular user identity of an electronic social networking application (e.g., hometowns, current residences, and/or "check-ins" registered with the electronic social networking platform by other user identities who are members of the particular user identity's social network), and represent the extracted location information and/or generate reports about the extracted location information so as to enable the particular user identity to glean better intelligence about the location information than the particular user identity otherwise may be able to do within the electronic social networking platform.

Figure 3:
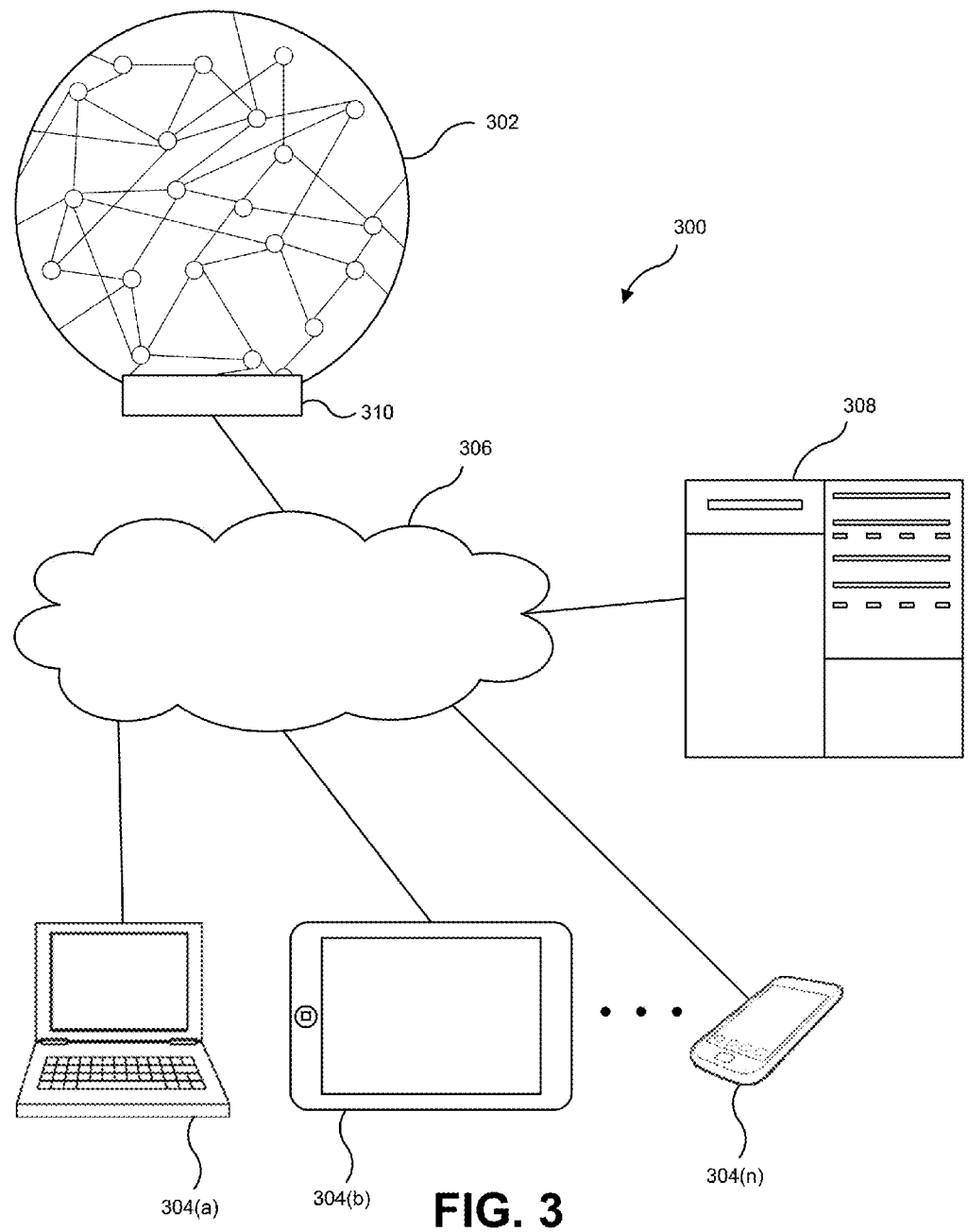
FIG. 3 is a block diagram of an example of a communications system.

FIG. 3 is a block diagram of an example of a communications system 300. For illustrative purposes, several elements illustrated in FIG. 3 and described below are represented as monolithic entities. However, these elements each may include and/or be implemented on numerous interconnected computing devices and other components that are designed to perform a set of specified operations.

As illustrated in FIG. 3, communications system 300 includes an electronic social networking platform 302 that is accessible to a number of computing devices 304(a)-304(n), including, for example, a laptop computer 304(a), a tablet computer 304(b), and a smartphone 304(n), over a network 306. In addition, communications system 300 also includes a computing system 308. Computing system 308 may be external to electronic social networking platform 302. As such, electronic social networking platform 302 may be accessible to computing system 308 over network 306. Additionally, computing system 308 may be accessible to computing devices 304(a)-304(n) over network 306.

Electronic social networking platform 302 may be implemented using one or more computing devices (e.g., servers) configured to provide a service to one or more client devices (e.g., computing devices 304(a)-304(n)) connected to electronic social networking platform 302 over network 306. The one or more computing devices on which electronic social networking platform 302 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 302. Furthermore, the one or more computing devices on which electronic social networking platform 302 is implemented each may include one or more processors for executing instructions stored in storage and/or received from one or more other electronic devices, for example over network 306. In addition, these computing devices also typically may include network interfaces and communication devices for sending and receiving data. Electronic social networking platform 302 also may provide an application programming interface (API) 310 that enables other applications to interact with and extract data from the electronic social networking platform 302.

Computing devices 304(a)-304(n) may be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. Each of the computing devices 304(a)-304(n) typically may have internal or external storage components for storing data and programs such as an operating system and one or more application programs. In particular, the internal or external storage components for each of the computing devices 304(a)-304(n) may store a client application for interfacing with electronic social networking platform 302 and/or a client application for interfacing with computing system 308. Additionally or alternatively, computing devices 304(a)-304(n) may be configured to interface with electronic social networking platform 302 or computing system 308 without a specific client application, using, for example, a web browser.

Each of the computing devices 304(a)-304(n) also typically may include a central processing unit (CPU) for executing instructions stored in storage and/or received from one or more other electronic devices, for example over network 306. Each of the computing devices 304(a)-304(n) also usually may include one or more communication devices for sending and receiving data. One example of such communications devices is a modem. Other examples include antennas, transceivers, communications cards, and other network adapters capable of transmitting and receiving data over a network (e.g., network 306) through a wired or wireless data pathway.

Network 306 may provide direct or indirect communication links between electronic social networking platform 302, computing devices 304(a)-304(n), and computing system 308. Examples of network 306 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing system 308 may be implemented using one or more computing devices (e.g., servers). The one or more computing devices on which computing system 308 is implemented may have internal or external storage components storing data and programs such as an operating system and one or more application programs. The one or more application programs may be implemented as instructions that are stored in the storage components and that, when executed, cause the one or more computing devices to provide the features ascribed herein to the computing system 308. Furthermore, the one or more computing devices on which computing system 308 is implemented each may include one or more processors for executing instructions stored in storage and/or received from one or more other electronic devices, for example, over network 306. In addition, these computing devices also typically may include network interfaces and communication devices for sending and receiving data.

Computing system 308 may host a social intelligence application. As such, computing system 308 may be configured to extract and process data from one or more electronic social networking platforms (e.g., electronic social networking platform 302). For example, computing system 308 may be configured to exploit API 310 to extract data from electronic social networking platform 302. Among other features, computing system 308 may be configured to extract data about multiple different user identities' social networks including (i) information about the members of each user identity's social network; (ii) communications shared with each user identity as well as communications shared with each member of the user identity's social network; (iii) information about non-personal enterprise objects that each user identity has endorsed as well as information about non-personal enterprise objects that each member of the user identity's social network has endorsed; (iv) information about locations where each user identity has checked-in as well as information about locations where each member of the user identity's social network has checked-in; and (v) information about events to which each user identity has been invited as well as information about events to which each member of the user identity's social network has been invited.

In some implementations, electronic social networking platform 302 may enable individual user identities to grant computing system 308 a token that defines permission levels related to data about the user identities' social networks that computing system 308 may access and extract from electronic social networking platform 302. For each individual user identity for which computing system 308 has a token, computing system 308 may extract information about the user identity and the other user identities who are members of the user identity's social network. This information may include identifying information for the user identity and each member of the user identity's social network as well as demographic information for the user identity and each member of the user identity's social network (e.g., hometown, current residence, age (or date of birth), gender, relationship status, etc.). For each individual user identity for which computing system 308 has a token, computing system 308 also may extract communications that have been shared with the user identity, information about non-personal enterprise objects the user identity has endorsed, information about locations where the user identity has checked-in, and/or information about events to which the user identity has been invited. Additionally or alternatively, for each individual user identity for which computing system 308 has a token, computing system 308 also may extract communications that have been shared with members of the user identity's social network, information about non-personal enterprise objects that members of the user identity's social network have endorsed, information about locations where members of the user identity's social network have checked-in, and/or information about events to which members of the user identity's social network have been invited.

In some implementations, after extracting data from electronic social networking platform 302, computing system 308 may store the extracted data in one more databases. For example, computing system 308 may store information extracted from electronic social networking platform 302 in one or more on-line transaction processing (OLTP) databases. Such OLTP databases may be implemented as relational or other forms of databases Computing system 308 then may process the extracted data stored in the database(s) and load the processed data into a data warehouse (e.g., an on-line analytical processing (OLAP) data warehouse) that may facilitate reporting and analysis of the processed data. Computing system 308 then may provide individual user identities for which computing system 308 has tokens with access to subsets of the processed data that correspond to data extracted from electronic social networking platform 302 using their tokens.

For example, for each individual user identity for which computing system 308 has a token, computing system 308 may provide the individual user identity with access to processed information about communications that were shared with the user identity as well as communications that were shared with members of the user identity's social network. Additionally or alternatively, computing system 308 may provide the user identity with access to processed information about non-personal enterprise objects the user identity endorsed as well as non-personal enterprise objects that members of the user identity's social network endorsed. Computing system 308 also may provide the user identity with access to processed information about locations where the user identity has checked-in and processed information about locations where members of the user identity's social network have checked-in as well as processed information about hometowns and current residences of members of the user identity's social networks. Moreover, computing system 308 also may provide the user identity with access to processed information about events to which the user identity has been invited as well as processed information about events to which members of the user identity's social network have been invited.

The individual user identities may utilize various different computing devices (e.g., computing devices 304(a)-304(n)) communicatively coupled to computing system 308 via network 306 to access the subsets of the processed data made available to the user identities by computing system 308. In addition to providing individual user identities with access to the processed data, computing system 308 also may provide these individual user identities with various analysis and reporting tools for manipulating the data included within the subsets of the processed data to which the individual user identities are provided access. Additionally or alternatively, such analysis and reporting tools may be provided within a client application resident on a computing device that an individual user identity uses to access the processed data made available by computing system 308. Among other reporting and analysis tools, computing system 308 (and/or the client application used to access computing system 308) may provide the user identities with filtering tools that enable the user identity to identify different segments of members within the user identity's social network (e.g., based on demographic characteristics such as current residence, age, gender, and/or relationship status) and analyze different aspects of the processed data (e.g., shared communications, endorsements, location information, and event information) relative to such segments.

A social intelligence application that provides individual user identities of an electronic social networking platform with access to the extracted and processed data as described above and/or that provides the individual user identities with reporting and analysis tools for manipulating such extracted and processed data may enable the individual user identities to glean better intelligence from the wealth of data available to them within the electronic social networking platform.

Location information registered with an electronic social networking platform by members of an individual user identity's social network (e.g., hometowns, current residences, and/or "check-ins") may be one example of data that is available to an individual user identity that includes a wealth of potentially relevant or valuable information that the individual user identity may fail to appreciate due to the sheer volume of location information available to the user identity and/or the scattered nature of the location information within the electronic social networking platform. As described herein, a social intelligence application may extract location information registered with an electronic social networking platform by members of a particular user identity's social network from the electronic social networking platform. Thereafter, the social intelligence application may provide the individual user identity with mechanisms for filtering the extracted location information, for example, based on one or more characteristics of the members of the particular user identity's social network who registered the location information.

FIGS. 4A-4F are diagrams of examples of a GUI 400 for a social intelligence application that enables review of aggregated location information relevant to a particular user identity within an electronic social networking platform (e.g., hometowns, current residences, and "check-ins" of user identities who are members of the particular user identity's social network). The social intelligence application may extract this location from the electronic social networking platform and process the extracted location information to facilitate review of the extracted location information by the particular user identity. In addition to extracting the location information, the social intelligence application also may extract information about the user identities to which the extracted location information pertains (e.g., user identity, age, gender, relationship status, etc.) from the electronic social networking platform. The social intelligence application also may process this information about the user identities and use this information to facilitate review of the extracted location information by the particular user identity.

Referring first to FIG. 4A, GUI 400 provides a view of aggregated hometown information for user identities who are members of the particular user identity's social network. In particular, GUI 400 lists the various different hometowns of the user identities of the particular user identity's social network (column 402) and indicates the number of user identities who are members of the particular user identity's social network who hail from each of the identified hometowns (column 404). In addition, GUI 400 presents aggregated demographic information about the user identities who are members of the particular user identity's social network who hail from each of the hometowns identified in column 402. For example, GUI 400 indicates the average age of the user identities who hail from each hometown (column 406); the percentage of the user identities who hail from each hometown who are female (column 408); the percentage of the user identities who hail from each hometown who are male (column 410); the percentage of the user identities who hail from each hometown who have registered that they are single with the electronic social networking platform (column 412); and the percentage of the user identities who hail from each hometown who have registered that they are in a relationship with the electronic social networking platform (414).

Depending upon the screen real estate available, the aggregated hometown information presented within the view provided by GUI 400 as illustrated in FIG. 4A may extend beyond the visible borders of the GUI 400. Consequently, GUI 400 may enable a user to scroll the view up or down in order to see additional hometown information presented by the GUI 400 in the view illustrated in FIG. 4A.

GUI 400 provides a number of selectable controls that enable the particular user identity to whom GUI 400 is presented to specify filters that should be applied to the location information extracted from the electronic social networking platform by the social intelligence application in order to manipulate the location information that is presented by the social intelligence application within GUI 400. More particularly, GUI 400 provides a selectable "Filter" control 416 and a selectable "By Friendlist" control 418.

As illustrated in FIG. 4B, in response to invocation of selectable "Filter" control 416, GUI 400 presents a filter menu 421 that provides controls that enable the particular user identity to specify that the hometown information presented in the view provided by GUI 400 should be filtered according to one or more of (i) the city, state, and/or country of the current residences of user identities who are members of the particular user identity's social network; (ii) the ages of the user identities who are members of the particular user identity's social network; (iii) the gender of the user identities who are members of the particular user identity's social network; and (iv) the relationship status of the of the user identities who are members of the particular user identity's social network. In response to manipulation of the filter controls provided within filter menu 421 by the particular user identity, the social intelligence application accesses extracted information about the user identities who are members of the particular user identity's social network and filters the hometown information presented within GUI 400 to include hometown information for only those user identities who that satisfy the demographic criteria specified by the particular user identity using filter menu 421.

Referring now to FIG. 4C, in response to invocation of selectable "By Friendlist" control 418, GUI 400 presents a filter menu 424 that provides controls that enable the particular user identity to specify that the hometown information presented in the view provided by GUI 400 should be filtered to include hometown information only for user identities who belong to designated subgroups of the particular user identity's social network that the user identity previously identified. In response to manipulation of the filter controls provided within filter menu 422 by the particular user identity, the social intelligence application accesses extracted information about the membership of subgroups of the particular user identity's social network and filters the hometown information presented within GUI 400 to include hometown information only for user identities who belong to the designated subgroup(s) of the particular user identity's social network selected by the particular user identity using filter menu 422.

The filtering controls provided by each of filter menus 421 and 422 may be used independently of one another and/or in combination with one another to define the user identities for whom location information is presented within GUI 400.

Referring again to FIG. 4A, GUI 400 also includes a selectable "Location Information Type" control 420 that enables the particular user identity to whom GUI 400 is presented to select the type of location information that the social intelligence application extracted from the electronic social networking platform that should be presented by the social intelligence application within GUI 400. As illustrated in FIG. 4D, in response to invocation of selectable "Location Information Type" control 420, GUI 400 presents a filter menu 424 that provides controls that enable the particular user identity to select the type of location information that is presented in the view provided by GUI 400. In particular, filter menu 424 enables the particular user identity to select "Hometown" location information, "Current City" location information, or "Check-In" location information.

For example, referring now to FIG. 4E, in response to a selection of "Current City" location information from filter menu 424 by the particular user identity to whom GUI 400 is presented, the social intelligence application repopulates the view of aggregated location information presented in GUI 400 with aggregated current residence information for user identities who are members of the particular user identity's social network. As illustrated in FIG. 4E, GUI 400 lists the various different cities of current residence of the user identities of the particular user identity's social network (column 426) and indicates the number of user identities who are members of the particular user identity's social network who currently reside in each of the cities identified (column 428). In addition, GUI 400 presents aggregated demographic information about the user identities who are members of the particular user identity's social network who reside in each of the cities identified in column 426. For example, GUI 400 indicates the average age of the user identities who currently reside in each city (column 430); the percentage of the user identities who currently reside in each city who are female (column 432); the percentage of the user identities who currently reside in each city who are male (column 434); the percentage of the user identities who currently reside in each city who have registered that they are single with the electronic social networking platform (column 436); and the percentage of the user identities who currently reside in each city who have registered that they are in a relationship with the electronic social networking platform (438). Continuing to refer to FIG. 4E, the social intelligence application provides selectable "Filter" control 416 and selectable "By Friendlist" control 418 to enable the particular user identity to whom GUI 400 is presented to filter the user identities for whom current residence information is presented within GUI 400 in a manner that is similar to the filtering of hometown information discussed above in connection with FIGS. 4A-4C.

Referring now to FIG. 4F, in response to a selection of "Check-In" location information from filter menu 424 by the particular user identity to whom GUI 400 is presented, the social intelligence application repopulates the view of aggregated location information presented in GUI 400 with aggregated "check-in" information for user identities who are members of the particular user identity's social network. As illustrated in FIG. 4F, GUI 400 lists the various different locations where user identities who are members of the particular user identity's social network have registered "check-ins" with the electronic social networking platform (column 440) and indicates the number of times user identities who are members of the particular user identity's social network have registered "check-ins" at each of the locations identified (column 444). In addition, GUI 400 also indicates the number of distinct members of the particular user identity's social network who have registered "check-ins" at each location (column 444) as well as the number of members of the particular user identity's social network who have registered multiple "check-ins" at each location (column 446). In some implementations, the social intelligence application may limit the "check-in" information presented in GUI 400 to include only information about "check-ins" that have been registered with the electronic social networking platform within some defined window of time (e.g., "check-ins" registered with the electronic social networking platform within the last week, month, year, etc.).

As illustrated in FIG. 4F, GUI 400 also presents aggregated demographic information about the user identities who have registered "check-ins" at each of the locations identified in column 440. For example, GUI 400 indicates the average age of the user identities who have registered "check-ins" at each location (column 448); the percentage of the user identities who have registered "check-ins" at each location who are female (column 450); the percentage of the user identities who have registered "check-ins" at each location who are male (column 452); the percentage of the user identities who have registered "check-ins" at each location who have registered that they are single with the electronic social networking platform (column 454); and the percentage of the user identities who have "checked-in" at each location who have registered that they are in a relationship with the electronic social networking platform (456). Continuing to refer to FIG. 4F, the social intelligence application provides selectable "Filter" control 416 and selectable "By Friendlist" control 418 to enable the particular user identity to whom GUI 400 is presented to filter the user identities for whom "check-in" information is presented within GUI 400 in a manner that is similar to the filtering of the hometown information discussed above in connection with FIGS. 4A-4C.

Enabling a particular user identity to view (and filter) aggregated information about "check-ins" registered by members of the particular user identity's social network as discussed above and illustrated in connection with FIG. 4F may enable the particular user identity to identify locations that are popular with members of the particular user identity's social networks (or with specific segments of the particular user identity's social network). Consequently, enabling the particular user identity to view (and filter) aggregated information about "check-ins" registered by members of the particular user identity's social network may enable the particular user identity to discover new locations to visit and/or to make more informed decisions about locations to visit.

FIGS. 5A-5C are flow charts 500, 530, and 560, respectively, that illustrate examples of processes for applying social intelligence techniques to location information relevant to a particular user identity within an electronic social networking platform. The processes illustrated in the flow charts 500, 530, and 560 of FIGS. 5A-5C, respectively, may be performed by a computing system, such as, for example, computing system 308 of FIG. 3.

Referring first to FIG. 5A, for each user identity of a set of multiple user identities of an electronic social networking platform, the computing system extracts data from the electronic social networking platform that reveals other user identities who are members of the user identities' social network (502). The computing system also stores the extracted data that reveals the other user identities who are members of the social networks of the set of multiple user identities in computer readable storage media (504). In some implementations, the computing system also may extract and store demographic information (e.g., current residence, age, gender, and/ or relationship status) about the other user identities who are members of the social networks of the set of multiple user identities.

In addition, for each user identity of the set of multiple user identities, the computing system extracts data that reveals locations where other user identities who are members of the user identity's social network have registered that they have visited with the electronic social networking platform (506). For example, in some implementations, the computing system extracts data that reveals locations where other user identities who are members of the social networks of the set of multiple user identities have registered "check-ins" with the electronic social networking platform. The extracted data that reveals locations where the other user identities have registered "check-ins" with the electronic social networking platform also may reveal numbers of times that each of the other user identities has registered "check-ins" at each of the different locations. The computing system also stores the extracted data that reveals the locations where other user identities who are members of the social networks of the set of user identities have registered that they have visited in computer readable storage media (508).

Furthermore, for any user identity of the set of multiple user identities, the computing system also makes available for display a view of an aggregation of at least some of the locations that the other user identities who are members of the user identity's social network have registered that they have visited (510). For example, as described above in connection with FIG. 4F, the computing system may make the view of the aggregation of the locations that the other user identities who are members of the user identity's social network have registered that they have visited available for display via a GUI, such as, for example, GUI 400, that is displayed on a computing device that is communicatively coupled to the computing system (e.g., by a network connection).

In some implementations, the computing system also may determine the number of distinct members of the user identity's social network who have visited each location included in the aggregation and make this information available for display as well. Additionally or alternatively, the computing system may determine the number of members of the user identity's social network who have visited individual locations included in the aggregation multiple times and make this information available for display as well.

Furthermore, in some implementations, the computing system also may aggregate demographic information (e.g., current residence, age, gender, and/or relationship status) about members of the user identity's social network who have visited each location and make such aggregated demographic information available for display as well. Additionally or alternatively, the computing system also may enable the user identity to specify that the view of the aggregation of the locations that members of the user identity's social network have registered that they have visited be filtered according to certain demographic characteristics of the members of the user identity's social network who registered that they have visited the locations. In response to a request to perform such filtering, the computing system may identify the members of the user identity's social network who satisfy the demographic criteria specified by the user identity and limit the "check-in" information included in the aggregated view to "check-ins" registered by members of the user identity's social network who satisfy the demographic criteria specified by the user identity.

Referring now to FIG. 5B, in another example of a process for applying social intelligence techniques to location information relevant to a particular user identity within an electronic social networking platform, the computing system identifies user identities who are members of a particular user identity's social network within an electronic social networking platform (532). In some implementations, the computing system also may access demographic information (e.g., current residence, age, gender, and/or relationship status) about the other user identities who are members of the particular user identity's social network.

The computing system also accesses data that reveals locations that at least some of the user identities identified as members of the particular user identity's social network have registered with the electronic social networking platform as locations that they have visited (534). For example, in some implementations, the computing system accesses data that reveals locations where other user identities who are members of the particular user identity's social network have registered "check-ins" with the electronic social networking platform. This data also may reveal numbers of times that each of the other user identities has registered "check-ins" at each of the different locations.

The computing system also makes available for display a view of an aggregation of at least some of the locations where other user identities who are members of the particular user identity's social network have registered that they have visited (536). For example, as described above in connection with FIG. 4F, the computing system may make the view of the aggregation of the locations that the members of the particular user identity's social network have registered that they have visited available for display via a GUI, such as, for example, GUI 400, that is displayed on a computing device that is communicatively coupled to the computing system (e.g., by a network connection).

In some implementations, the computing system also may determine the number of distinct members of the particular user identity's social network who have visited each location included in the aggregation and make this information available for display as well. Additionally or alternatively, the computing system may determine the number of members of the particular user identity's social network who have visited individual locations included in the aggregation multiple times and make this information available for display as well.

Furthermore, in some implementations, the computing system also may aggregate demographic information (e.g., current residence, age, gender, and/or relationship status) about members of the particular user identity's social network who have visited each location and make such aggregated demographic information available for display as well. Additionally or alternatively, the computing system also may enable the particular user identity to specify that the view of the aggregation of the locations that members of the particular user identity's social network have registered that they have visited be filtered according to certain demographic characteristics of the members of the particular user identity's social network who registered that they have visited the locations. In response to a request to perform such filtering, the computing system may identify the members of the particular user identity's social network who satisfy the demographic criteria specified by the particular user identity and limit the "check-in" information included in the aggregated view to "check-ins" registered by members of the particular user identity's social network who satisfy the demographic criteria specified by the particular user identity.

Referring now to FIG. 5C, in another example of a process for applying social intelligence techniques to location information relevant to a particular user identity within an electronic social networking platform, the computing system extracts data from an electronic social networking platform that reveals user identities who are members of a particular user identity's social network (562) and stores this data in computer readable storage media (564).

In addition, the computing system extracts data from the electronic social networking platform that reveals residence information (e.g., hometown and/or current residence) that the other user identities who are members of the particular user identity's social network have registered with the electronic social networking platform (566) and stores this data in computer-readable storage media (568).

The computing system also extracts data about additional demographic characteristics (e.g., age, gender, and/or relationship status) of the other user identities who are members of the particular user identity's social network (570) and stores this data in computer-readable storage media (572).

Thereafter, the computing system makes available for display a view of an aggregation of at least some of the residence information that the other user identities who are members of the particular user identity's social network have registered with the platform (574). For example, as described above in connection with FIG. 4A, the computing system may make a view of an aggregation of hometown information that the other user identities who are members of the particular user identity's social network have registered with the platform available for display via a GUI, such as, for example, GUI 400, that is displayed on a computing device that is communicatively coupled to the computing system (e.g., by a network connection). Additionally or alternatively, as described above in connection with FIG. 4E, the computing system may make a view of an aggregation of current residence information that the other user identities who are members of the particular user identity's social network have registered with the platform available for display via a GUI, such as, for example, GUI 400, that is displayed on a computing device that is communicatively coupled to the computing system (e.g., by a network connection).

Furthermore, in some implementations, for each location for which members of the particular user identity's social network have registered residence information, the computing system also may aggregate demographic information (e.g., age, gender, and/or relationship status) about members of the particular user identity's social network who registered residence information for the location and make such aggregated demographic information for each location included in the view available for display as well.

The computing system also enables filtering of the aggregation of the residence information that the other user identities who are members of the particular user identity's social network have registered with the electronic social networking platform based on one or more of the additional demographic characteristics (e.g., age, gender, and/or relationship) of the other user identities who are members of the particular user identity's social network (576). In response to a request to perform such filtering, the computing system may identify the members of the particular user identity's social network who satisfy the demographic criteria specified by the particular user identity and limit the residence information included in the aggregated view to residence information registered by members of the particular user identity's social network who satisfy the demographic criteria specified by the particular user identity.

A number of methods, techniques, systems, and apparatuses have been described. Nevertheless, various modifications may be made without departing from the scope of this disclosure. For example, although various social intelligence techniques generally are disclosed herein as being performed externally to an electronic social networking platform, in some implementations, the various social intelligence techniques disclosed herein may be performed internally by an electronic social networking platform.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A computer-implemented method comprising:
    for each of a set of multiple user identities of an electronic social networking platform, extracting, from the platform, data that reveals other user identities of the platform who are members of the user identity's social network;
    storing, in computer-readable storage media that is associated with a computing system that is external to the platform, the extracted data that reveals the other user identities who are members of the social networks of the set of user identities;
    for each user identity of the set of user identities of the platform, extracting, from the platform, data that reveals locations where other user identities who are members of the user identity's social network have registered that they have visited;
    storing, in computer-readable storage media that is associated with the computing system that is external to the platform, the extracted data that reveals the locations where other user identities who are members of the user identity's social network have registered that they have visited; and
    for any one of the set of user identities, making available for display, at a computing device associated with the user identity, a view of an aggregation of at least some of the locations that the other user identities who are members of the user identity's social network have registered that they have visited.

2. The method of claim 1 wherein:
extracting data that reveals locations where other user identities who are members of the user identity's social network have registered that they have visited includes extracting data that reveals:
locations where the other user identities who are members of the user identity's social network have registered that they have visited, and
numbers of times that individual ones of the other user identities who are members of the user identity's social network have registered that they have visited the locations with the platform; and
making available for display a view of an aggregation of locations that the other user identities who are members of the user identity's social network have registered that they have visited includes making available for display a view of an aggregation of locations that the other user identities who are members of the user identity's social network have registered that they have visited that reflects aggregated numbers of times that the other user identities have registered that they have visited the locations included in the aggregation.

3. The method of claim 2 further comprising determining, from the extracted data that reveals numbers of times that individual ones of the other user identities who are members of the user identity's social network have registered that they have visited the locations with the platform, numbers of distinct other user identities who have registered visiting each of the locations, wherein:
making available for display a view of an aggregation of locations that the other user identities who are members of the user identity's social network have registered that they have visited includes making available for display a view of an aggregation of locations that the other user identities who are members of the user identity's social network have registered that they have visited that reflects numbers of distinct other user identities who have registered visiting each of the locations included in the aggregation.

4. The method of claim 2 further comprising determining, from the extracted data that reveals numbers of times that individual ones of the other user identities who are members of the user identity's social network have registered that they have visited the locations with the platform, numbers, for each location, of other user identities who have registered visiting the location multiple times, wherein:
making available for display a view of an aggregation of locations that the other user identities who are members of the user identity's social network have registered that they have visited includes making available for display a view of an aggregation of locations that the other user identities who are members of the user identity's social network have registered that they have visited that reflects numbers, for each location, of other user identities who have registered visiting the location multiple times.

5. The method of claim 1 further comprising:
extracting, from the platform, data about demographic characteristics of the other user identities; and
enabling filtering of the aggregation of the locations that the other user identities who are members of the user identity's social network have registered that they have visited based on demographic characteristics of the other user identities who registered that they have visited the locations.

6. A computer-implemented method comprising:
identifying other user identities of an electronic social networking platform who are members of a particular user identity's social network within the platform;
accessing data that reveals locations that at least some of the identified other user identities have registered with the platform as locations that they have visited; and
making available for display, at a computing device associated with the particular user identity, a view of an aggregation of at least some of the locations where other user identities who are members of the particular user identity's social network have registered that they have visited.

7. The method of claim 6 wherein:
accessing data that reveals locations that at least some of the identified other user identities have registered with the platform as locations that they have visited includes accessing data that reveals:
locations that at least some of the identified other user identities have registered with the platform as locations that they have visited, and
numbers of times that individual ones of the identified other user identities have registered that they have visited the locations with the platform; and
making available for display a view of an aggregation of locations where the other user identities have registered that they have visited includes making available for display a view of an aggregation of locations where other user identities have registered that they have visited that reflects aggregated numbers of times that the other user identities have registered that they have visited the locations included in the aggregation.

8. The method of claim 7 further comprising determining, from the data that reveals the numbers of times that the identified other user identities have registered that they have visited the locations with the platform, numbers of distinct other user identities who have registered visiting each of the locations, wherein:
making available for display a view of an aggregation of locations where other user identities have registered that they have visited includes making available for display a view of an aggregation of locations where other user identities have registered that they have visited that reflects numbers of distinct other user identities who have registered visiting each of the locations included in the aggregation.

9. The method of claim 7 further comprising determining, from the data that reveals the numbers of times that the identified other user identities have registered that they have visited the locations with the platform, numbers, for each location, of other user identities who have registered visiting the location multiple times, wherein:
making available for display a view of an aggregation of locations where other user identities have registered that they have visited includes making available for display a view of an aggregation of locations where other user identities have registered that they have visited that reflects numbers, for each location, of other user identities who have registered visiting the location multiple times.

10. The method of claim 6 wherein making available for display, at the computing device associated with the particular user identity, the view of the aggregation of the locations where other user identities who are members of the particular user identity's social network have registered that they have visited includes causing a display, at the computing device associated with the particular user identity, the view of the aggregation of the locations where other user identities who are members of the particular user identity's social network have registered that they have visited.

11. The method of claim 6 wherein:
accessing data that reveals locations that at least some of the identified other user identities have registered with the platform as locations that they have visited includes:
extracting, from the electronic social networking platform, the data that reveals the locations that at least some of the identified other user identities have registered with the platform as locations that they have visited, and
storing the extracted data in computer-readable storage media associated with a computing system that is external to the electronic social networking platform; and
making available for display, at the computing device associated with the particular user identity, the view of the aggregation of the locations where other user identities who are members of the particular user identity's social network have registered that they have visited includes transmitting, from the computer-readable storage media associated with the computing system that is external to the electronic communications platform, the aggregation of the locations where other user identities who are members of the particular user identity's social network have registered that they have visited.

12. The method of claim 11 wherein extracting the data that reveals the locations that at least some of the identified other user identities have registered with the platform as locations that they have visited includes:
requesting data that reveals locations that at least some of the identified other user identities have registered with the platform as locations that they have visited via an API for the platform; and
receiving, from the platform, the data that reveals the locations that at least some of the identified other user identities have registered with the platform as locations that they have visited responsive to the request.

13. The method of claim 6 further comprising:
accessing data about demographic characteristics of the other user identities; and
enabling filtering of the aggregation of the locations where other user identities who are members of the particular user identity's social network have registered that they have visited based on demographic characteristics of the other user identities who registered that they have visited the locations.

14. The method of claim 13 wherein enabling filtering of the aggregation of the locations where other user identities who are members of the particular user identity's social network have registered that they have visited based on demographic characteristics of the other user identities who registered that they have visited the locations includes enabling filtering of the aggregation of the locations based on at least one of residence, age, gender, and relationship status of the other user identities who registered that they have visited the locations.

15. The method of claim 6 wherein
accessing data that reveals locations that at least some of the identified other user identities have registered with the platform as locations that they have visited includes accessing data that reveals commercial venues that at least some of the identified other user identities have registered with the platform as locations that they have visited; and
making available for display, at a computing device associated with the particular user identity, a view of an aggregation of at least some of the locations where other user identities who are members of the particular user identity's social network have registered that they have visited includes making available for display, at a computing device associated with the particular user identity, a view of an aggregation of at least some of the commercial venues where other user identities who are members of the particular user identity's social network have registered that they have visited.

16. The method of claim 6 wherein
accessing data that reveals locations that at least some of the identified other user identities have registered with the platform as locations that they have visited includes accessing data that reveals geographic locations that at least some of the identified other user identities have registered with the platform as locations that they have visited; and
making available for display, at a computing device associated with the particular user identity, a view of an aggregation of at least some of the locations where other user identities who are members of the particular user identity's social network have registered that they have visited includes making available for display, at a computing device associated with the particular user identity, a view of an aggregation of at least some of the geographic locations where other user identities who are members of the particular user identity's social network have registered that they have visited.

17. A computer-implemented method comprising:
extracting, from an electronic social networking platform, data that reveals other user identities of the platform who are members of a particular user identity's social network;
storing, in computer-readable storage media that is associated with a computing system that is external to the platform, the extracted data that reveals the other user identities who are members of the social network of the particular user identity;
extracting, from the platform, data that reveals residence information that the other user identities who are members of the particular user identity's social network have registered with the platform;
storing, in computer-readable storage media that is associated with the computing system that is external to the platform, the extracted data that reveals the residence information that the other user identities who are members of the particular user identity's social network have registered with the platform;
extracting, from the platform, data about additional demographic characteristics of the other user identities who are members of the particular user identity's social network other than residence information;
storing, in computer-readable storage media that is associated with the computing system that is external to the platform, the extracted data about the additional demographic characteristics of the other user identities who are members of the particular user identity's social network;
making available for display, at a computing device associated with the particular user identity, a view of an aggregation of at least some of the residence information that the other user identities who are members of the particular user identity's social network have registered with the platform; and enabling filtering of the aggregation of the residence information that the other user identities who are members of the particular user identity's social network have registered with the platform based on one or more of the additional demographic characteristics of the other user identities extracted from the platform.

18. The method of claim 17 wherein:

extracting data that reveals residence information that the other user identities who are members of the user identity's social network have registered with the platform includes extracting data that reveals current cities of residence that the other user identities who are members of the user identity's social network have registered with the platform;

storing, in computer-readable storage media that is associated with the computing system that is external to the platform, the extracted data that reveals the residence information that the other user identities who are members of the user identity's social network have registered with the platform includes storing, in computer-readable storage media that is associated with the computing system that is external to the platform, the extracted data that reveals the current cities of residence that the other user identities who are members of the user identity's social network have registered with the platform;

making available for display a view of an aggregation of at least some of the residence information that the other user identities who are members of the user identity's social network have registered with the platform includes making available for display a view of an aggregation of at least some of the current cities of residence that the other user identities who are members of the user identity's social network have registered with the platform; and enabling filtering of the aggregation of the residence information that the other user identities who are members of the user identity's social network have registered with the platform includes enabling filtering of the aggregation of the current cities of residence that the other user identities who are members of the user identity's social network have registered with the platform.

19. The method of claim 17 wherein:

extracting data that reveals residence information that the other user identities who are members of the user identity's social network have registered with the platform includes extracting data that reveals hometowns that the other user identities who are members of the user identity's social network have registered with the platform;

storing, in computer-readable storage media that is associated with the computing system that is external to the platform, the extracted data that reveals the residence information that the other user identities who are members of the user identity's social network have registered with the platform includes storing, in computer-readable storage media that is associated with the computing system that is external to the platform, the extracted data that reveals the hometowns that the other user identities who are members of the user identity's social network have registered with the platform;

making available for display a view of an aggregation of at least some of the residence information that the other user identities who are members of the user identity's social network have registered with the platform includes making available for display a view of an aggregation of at least some of the hometowns that the other user identities who are members of the user identity's social network have registered with the platform; and enabling filtering of the aggregation of the residence information that the other user identities who are members of the user identity's social network have registered with the platform includes enabling filtering of the aggregation of the hometowns that the other user identities who are members of the user identity's social network have registered with the platform.

20. The method of claim 17 wherein enabling filtering of the aggregation of the residence information that the other user identities who are members of the user identity's social network have registered with the platform based on one or more of the additional demographic characteristics of the other user identities extracted from the platform includes enabling filtering of the aggregation of the residence information that the other user identities who are members of the user identity's social network have registered with the platform based on at least one of age, gender, and relationship status of the other user identities who are members of the user identity's social network.

* * * * *